Oct. 25, 1960    L. PÉRAS    2,957,564
GEARBOX SYNCHROMESHING DEVICES
Filed June 16, 1958    2 Sheets-Sheet 1

Inventor
Lucien Péras
By Stevens Davis Miller & Mosher
attorneys

Oct. 25, 1960    L. PÉRAS    2,957,564
GEARBOX SYNCHROMESHING DEVICES
Filed June 16, 1958    2 Sheets-Sheet 2

Inventor
Lucien Péras
by Stevens Davis Miller + Mosher
attorneys

United States Patent Office 2,957,564
    Patented Oct. 25, 1960

2,957,564

GEARBOX SYNCHROMESHING DEVICES

Lucien Péras, Billancourt, France, assignor to Regie Nationale des Usines Renault, Billancourt, France Filed June 16, 1958, Ser. No. 742,150

Claims priority, application France June 27, 1957

3 Claims. (Cl. 192—53)

The present invention relates to a synchro-meshing device for gear-box which is simple to construct and efficient in operation.

This device, according to the invention, is characterized notably in that it comprises a spring ring having a tapered outer surface and on its inner face teeth adapted to co-act with a set of teeth carried by the pinion to be synchronized. Furthermore, this spring ring is cut to permit a reduction of its diameter and so arranged as to prevent the selected speed from being effectively engaged until the corresponding gears are actually synchronized.

This invention is also concerned with a modification whereby the spring ring carries on its outer face a set of teeth adapted to co-act with corresponding teeth machined on the pinion, and on its inner face a cylindro-conical surface permitting its diametral expansion by a corresponding surface carried by the sliding hub, said spring ring being also cut to permit its diametral expansion and arranged to prevent the selected speed from being effectively engaged until the corresponding gears are actually synchronized.

The invention will now be described with reference, by way of example, to the attached drawings forming part of this specification and illustrating diagrammatically two different forms of embodiment of the invention.

Figure 1:
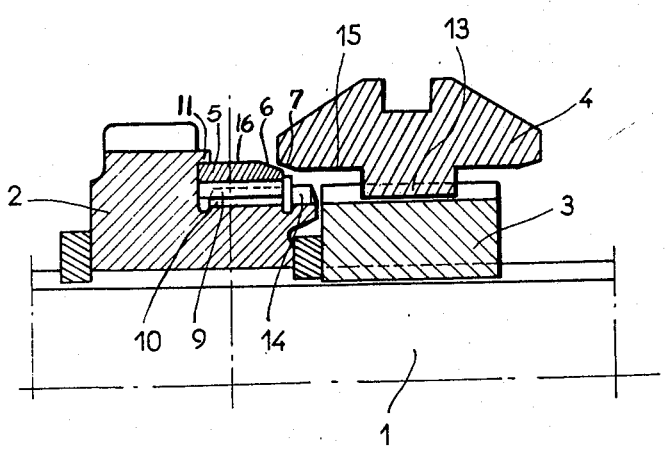
Figure 1 is an axial half-section showing the device.

Referring to the drawings, the output shaft 1 carries a driving pinion 2 mounted for loose rotation on the shaft 1 but rotatably solid with the engine clutch disc, and a sleeve 3 driven by said shaft and carrying in turn the sliding hub 4 according to the conventional practice.

According to this invention, this pinion 2 carries a circular ring 5 having a tapered outer face 6 adapted, for synchronizing purposes, to engage the corresponding tapered inner surface 7 of the sliding hub. The ring 5 is formed with a cylindrical surface 16 adjacent to the tapered surface 6. Similarly, the sliding hub 4 is formed with a cylindrical inner portion 15 adjacent to the inner tapered surface 7, as shown.

Figure 2:
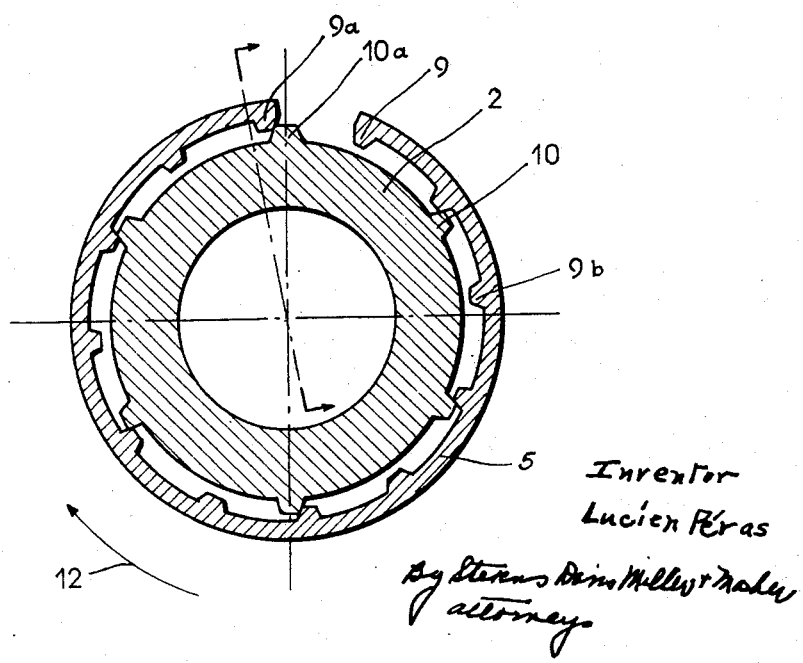
Figure 2 is a cross-section thereof.

As shown more particularly in Fig. 2, this ring is cut and thus a gap is left between its peripheral ends; it carries on the inner face a set of dogs or teeth 9 having skew flanks co-acting with corresponding spaced teeth 10 formed on the outer face of the pinion. This ring is mounted and kept in a partially clamped condition by a collar portion 11 projecting on the pinion, as shown. Finally, the sliding hub and the pinion are provided with the conventional dog teeth 13, 14.

The operation of this device is as follows:

As shown in Fig. 1, when the sliding hub 4 is axially moved towards the ring 5, the synchronizing cones 6, 7 are caused to engage each other, and the spring ring 5, which was initially considered as rotating faster than the shaft 1, will now tend to rotate at the same speed as the hub 4 and shaft 1, and abuts through the teeth 9, 10 against pinion 2. Any additional axial effort applied to the sliding hub 4 will tend to close the synchronizing ring 5 but this diameter-reducing movement will be counteracted on the one hand by the reaction resulting from the relative engagement of the corresponding cones 6, 7, and on the other hand by the synchronizing effort applied to the cone (in the direction of the arrow 12) which is opposite to the direction of the clamping movement applied to the spring ring.

Upon completion of the synchronizing movement, when the ring diameter begins to become smaller under the preponderant action of the tapered circular bearing surfaces with respect to the reactions of the teeth flanks, there remains but one contact through the teeth 9a, 10a and the device will then operate only under self-tightening conditions, but during a very short time period.

The axial effort applied to the sleeve when the synchronization has become effective, that is, when the reactions at 9a and 10a are reduced to zero, causes, through the cone action in the form of an axial sliding movement, the clamping of the ring 5 thereby permitting the gear shift for the final phase of the movement which corresponds to the dog engagement.

This release, when the pinion 2 and shaft 1 have been properly synchronized in speed, will facilitate the dog engagement due to the uncoupling of the male and female cones, which do not contact each other; the cylindrical faces 15, 16 slip on each other and therefore will not counteract a relative movement of the members concerned which may be necessary for causing the two sets of dogs to engage each other in case they were not properly aligned.

The teeth 9, 9b of the ring illustrated in Fig. 2, which are not in contact with the teeth 10 will be able to become operative to permit synchronizing process in lieu of the other contacting teeth, in case shaft 1 rotated initially faster than pinion 2. The teeth 10 of this pinion will mesh after a very slight relative rotation with the teeth 9, 9b of the spring ring, thus providing the synchronizing process as already set forth.

Figure 3:
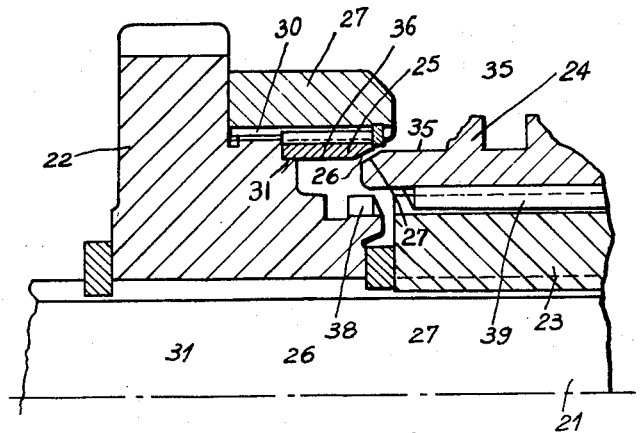
Figure 3 is an axial half-section showing a modified embodiment of the device.
Figure 4:
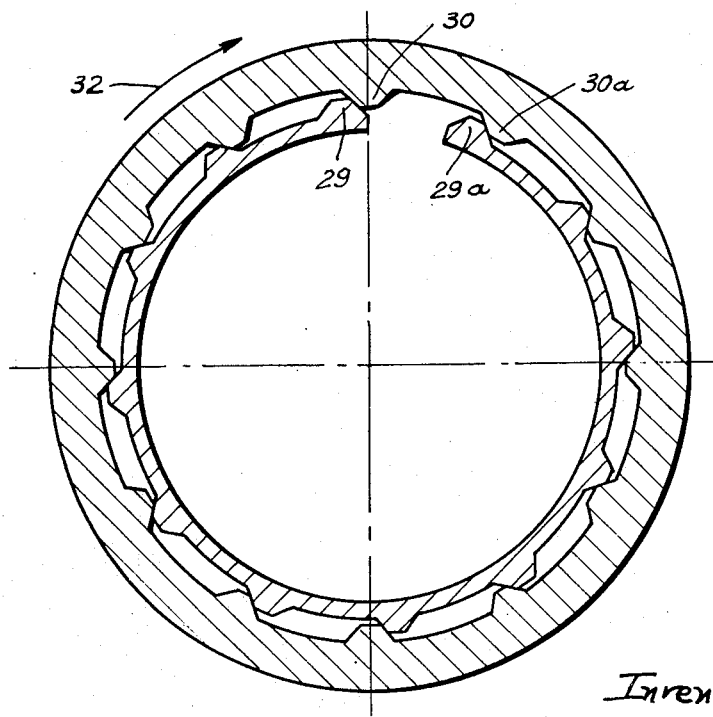
Figure 4 is a cross-section of this modified embodiment.

In the modified form of embodiment illustrated in Figs. 3 and 4, the output shaft 21 carries a driving pinion 22 mounted for loose rotation on this shaft but the pinion is rotatably solid with the engine clutch disc, and a sleeve 23 is keyed or splined on the shaft; this sleeve 23 carries the usual sliding hub 24.

The pinion 22 carries a circular ring 37 solid therewith and formed on its inner face with skew-flanged teeth 30.

Mounted internally of this ring 37 is a split spring ring 25 having skew-flanged teeth 29 machined on its inner face and all adapted to co-act with the teeth 30.

The ring 25 is mounted in a partially expanded condition on a centering shoulder 31 and held by the teeth 30 which, at this time, are all in contact with the teeth 29.

Furthermore, this spring ring 25 is formed with a synchronizing tapered portion 26 adapted to contact the tapered portion 27 of the sliding hub.

The spring ring 25 is also formed with a cylindrical surface 36 adjacent to the tapered surface. Similarly, the sliding hub has a cylindrical portion 35 adjacent to the tapered portion 27.

The pinion 22 has dog teeth 38 machined thereon which are adapted, at the end of the synchronizing movement of the sliding hub, to mesh with the dog teeth 39 of the sliding hub.

This device operates as follows:

Referring to Fig. 3, the movement of sliding hub 24 causes the synchronizing cones 26, 27 to engage each other, and the ring 25 and the pinion 22 which, at the start, are considered as rotating slower than the shaft 21, engage each other through their teeth 29, 30.

Any additional axial effort applied to the sliding hub 24 will tend to open the spring ring, but this expansion movement is counteracted by the reaction of the bearing contacts taking place obliquely and also by the synchronizing effort applied to the cone face (in the direction of the arrow 32) which is opposite to the ring expansion movement.

During the final phase of the synchronizing movement, when the ring begins to expand under the influence of the preponderant action exerted by the circular cone faces with respect to the teeth flank reactions, there remains only one contact between teeth 29a and 30a, and the device operates only as a self-tightening means but during a very short time period.

The axial effort applied to the sleeve when the synchronization is finally obtained, that is, when the reactions at teeth 29a—30a are cancelled or reduced to zero, causes through the cone action in relative axial slipping conditions the complete expansion of the ring to permit the gear shift and therefore the final phase of the movement which corresponds to the meshing engagement of dog teeth 38 and 39.

This release, when the synchronization of the speeds of pinion 22 and shaft 21 is obtained, facilitates the dog meshing by the disengagement of the male and female cones from each other, the cylindrical portions 35 and 36 slipping on each other and permitting a relative movement of the parts concerned, which movement may be necessary for effecting the engagement of the dog teeth in case the latter were not exactly aligned with one another.

In this modified embodiment it will be seen that as all the teeth 29 and 30 are in meshing engagement, the bearing pressure is reduced without interfering with the proper operation of the synchromesh device. If at the start the ring 25 and pinion 22 rotated faster than shaft 21, the ring 25 would be retarded by the sliding hub 24 and the teeth 29a and 30 will engage one another with a slight relative rotation, thereby providing the synchronizing process as already set forth.

I claim:
1. A synchromeshing device for gear box which includes a sliding hub splined on a drive shaft and a driving pinion rotatably circumposed on the shaft alongside the hub and to be connected thereto, said device comprising a spring ring interposed between the pinion and the hub and having one side formed with a cylindrical surface provided with a tapered leading edge portion facing the hub, said hub having a corresponding cylindrical surface and a tapered leading edge portion facing the ring, said surface of the hub being adapted to coact with the surface of the one side of the ring to frictionally interlock the hub and ring, said ring having on its other side a set of circumferentially spaced teeth, said pinion having a corresponding set of teeth adapted to co-act therewith, said ring being radially split and formed with a peripheral gap permitting a variation of its diameter.

2. A synchromeshing device according to claim 1, wherein said ring has its outer side formed with the cylindrical surface and its inner side formed with the set of teeth co-acting with the corresponding teeth formed on the pinion, said ring being kept in a partially clamped position to reduce its diameter by the synchronizing sliding hub, and being also adapted to be clamped to a greater extent to permit the relative meshing engagement of the teeth of the pinion and the sliding hub through the relative sliding contact of the cylindrical surface portions of the ring and the hub.

3. A synchromeshing device according to claim 1, wherein said ring is formed on its inner side with its cylindrical surface and on its outer side is provided with the set of teeth corresponding with the set of teeth on the pinion, said ring being expanded to permit the relative meshing engagement of the teeth of pinion with the sliding hub.

References Cited in the file of this patent

UNITED STATES PATENTS

| | | |
|---|---|---|
| 2,488,044 | Voigt | Nov. 15, 1949 |
| 2,495,411 | Frost | Jan. 24, 1950 |

FOREIGN PATENTS

| | | |
|---|---|---|
| 875,903 | France | July 13, 1942 |